Nov. 27, 1928.
O. D. TREIBER
1,692,966
METHOD OF UNITING METAL OBJECTS
Filed Sept. 13, 1927
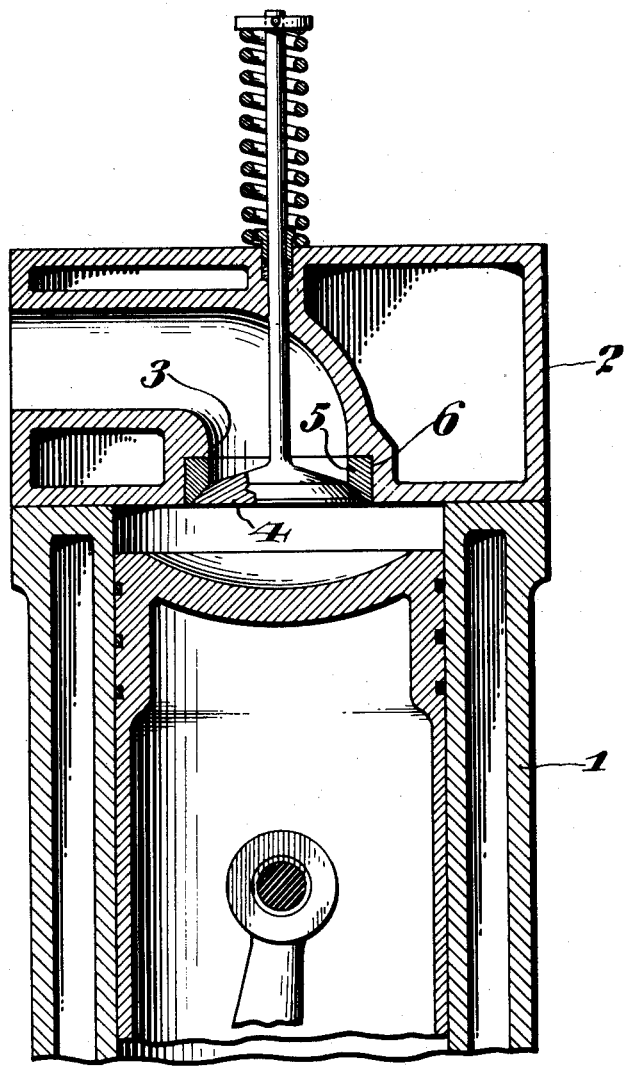

Patented Nov. 27, 1928.

1,692,966

UNITED STATES PATENT OFFICE.

OTIS D. TREIBER, OF COLLINGSWOOD, NEW JERSEY, ASSIGNOR TO TREIBER DIESEL ENGINE CORPORATION, OF CAMDEN, NEW JERSEY, A CORPORATION OF NEW JERSEY.

METHOD OF UNITING METAL OBJECTS.

Application filed September 13, 1927. Serial No. 219,258.

My invention relates to methods of uniting metal objects together, one within the other, the outer member being provided with an opening for the reception of the inner member or a portion thereof.

In the methods heretofore followed one common practise has been to heat the metal object which is to become the outer member of the united objects or members which causes expansion thereof, after which the smaller member or a portion thereof is inserted within an opening in the heated member. The latter is then allowed to cool. In cooling it contracts and binds or squeezes against the inner member or against that portion thereof within the said opening and thus the inner member is held securely in position within the outer member or within the opening therein.

In many cases the heating of one of the objects to be united in the manner as suggested is objectionable because the metal is of such character that the heating thereof to a temperature necessary to effect sufficient expansion to permit the insertion of the other metal member or a portion thereof into or through an opening therein causes a change in the internal or molecular structure of the said heated member whereby its characteristics may be so changed as to render it less suitable for the purpose for which it may have been intended.

It also happens at times that the metal member which is heated to cause its expansion to permit the insertion of a smaller metal member into an opening therein or therethrough is warped or cracked, thereby rendering it unfit for use, thus entailing loss and expense.

I have discovered that metal objects may be united by a method which may be described generically as the reverse of that heretofore used and above referred to. The method invented by me for uniting or fastening together two metal objects or members consists in the subjecting of one or two metal members or objects which are to be united to intense cold and while it is in such cold state inserting it or a portion thereof into or through an opening in the other member which preferably is at normal room temperature. The member which is subjected to such cold or refrigerating action contracts and when in contracted condition may be inserted into the opening provided for it in the other member. As the temperature of the member which has been cooled as stated increases after the two members have been placed in united relation to each other, it expands and presses against the surrounding wall of the opening, in which it is located.

One art in which my invention is of especial utility and value is that relating to the manufacture of engines, such as internal combustion engines. In engines of the latter character, the valve seat rings are mounted in the cylinder heads. In the process of manufacturing these heads, recesses or openings are provided therein for the reception of the valve seats. Heretofore the method has been to heat the cylinder heads to cause expansion thereof to a sufficient extent to enlarge the said recess or opening sufficiently to permit the insertion of the valve seat ring therein. The said valve seat ring having been inserted, the cylinder head is allowed to cool and in cooling, contraction takes place so that the surrounding wall of said recess or opening binds against the outer side or surface of the said valve seat ring so as to bind and unite the cylinder head and valve seat ring together.

In some cases cylinder heads are made of heat-treated aluminum. In such cases the heating of the cylinder heads to a temperature sufficiently high to cause the necessary expansion thereof to permit the insertion of a valve seat ring into the recess or opening provided therefor, would so change the structure as to destroy the advantage of such heat treatment; hence the desirability and great advantage of my invention.

For the purpose of facilitating a description of the invention, I shall describe the same in connection with the drawing in which I have illustrated in central longitudinal section, a portion of an internal combustion engine including the cylinder head which is provided with a valve seat ring.

It is to be understood that I have illustrated a construction of the character indicated for purposes of description only and that such illustration is not to operate to limit in any way the scope of the invention which, as I have already suggested, is capable of general application.

The essential feature of my invention consists in the reduction in temperature and consequent contraction of the dimensions of that one of two members to be united and the insertion thereof or of a portion thereof into or through a recess or opening in or through the other which may be at ordinary room temperature. The manner in which the temperature may be lowered to the extent required is immaterial.

I propose to obtain such reduction in temperature by immersing that one of the two members which is or a portion of which is to be inserted into or through an opening in the other in a bath of liquefied gas, for example, liquefied air. However, the liquids produced by the liquefaction of other gases may be employed.

Liquefied air has a temperature at normal atmospheric pressure of approximately minus 312.5 degrees Fahrenheit. It therefore, will be seen that if an object or member of metal which is to be united with another object or member of metal is placed in a bath of liquid air, its temperature may be reduced to such an extent that it may have a temperature of over 300 degrees Fahrenheit, less than that of the other of the members with which it is to be united. I have found that the coefficient of expansion and contraction at temperatures below zero is the same approximately as the coefficient of expansion at temperatures above zero. It will be seen therefore, that when a metal object is subjected to intense cold it contracts in substantially the same ratio as it would have expanded in case it had been subjected to heat.

Although I have referred to liquefied air as the cooling medium employed by me in the treatment of metal objects in the carrying out of my process or method, yet I desire it to be understood that the liquids obtained by the liquefaction of other gases, may be employed; and also that certain liquids (for example acetone, alcohol, carbon-disulphide, etc.), may be cooled to a sufficient extent without freezing or becoming solid to constitute a suitable medium for the treatment of one of two objects to be united in accordance with my invention. The reduction in temperature need be sufficient only to cause sufficient contraction of the member treated to permit the insertion thereof or of a portion thereof into the opening of the other member with which it is to be united.

In the drawing I have shown a cylinder 1 of an internal combustion engine having a piston head 2 provided with a port at 3 which is adapted to be controlled by means of a valve 4 which co-operates with a valve ring seat 5 mounted within a recess or opening 6. In uniting the valve seat 5 with the cylinder head 2 the former is subjected to intense cold. The method at present preferred by me consists in the placing of the said valve ring seat 5 in a bath of liquefied air. By this means the temperature of the valve seat ring 5 may be reduced to such an extent that it is from three hundred to three hundred and fifty degrees or more Fahrenheit, less than the temperature of the valve head 2 within which the recess or opening 6 is located and into which the said valve seat ring is to be placed. After the said valve seat ring has been cooled and placed in position as shown in the drawing, the structure is allowed to remain in a room at ordinary room temperature. The temperature of the valve seat ring rises with the result that expansion thereof takes place so that it presses against the surrounding wall of the recess or opening 6 and is bound and held permanently in position in the said recess or opening.

My invention is of especial value and utility for the mounting of valve seat rings in position in the recesses or openings provided therefor in the cylinder heads of internal combustion engines because it renders unnecessary the heating of the said cylinder heads which is objectionable for the reasons herein before stated.

Frequently the valve seat rings for internal combustion engines consist of aluminum bronze, the coefficient expansion of which is approximately .00001233 per degree Fahrenheit. As many of these valve seats are of a diameter of around five inches, it will be seen that the contraction thereof is sufficient to permit the insertion thereof readily into the recess or opening 6 notwithstanding the fact that at normal atmospheric temperature the diameter of said ring is approximately .007 of an inch greater in diameter than the diameter of said opening.

Although I have indicated a possible difference in temperature between the valve seat ring 5 and the piston head 2 of over 350 degrees Fahrenheit, I desire it to be understood that it is by no means necessary that there shall be such great differences in temperature in order to permit the practising of my invention.

Although I have suggested that the valve seat rings 5 are frequently of a diameter of around five inches, they may and frequently are of smaller and of larger diameter. In any case they may be placed in position in the recesses or openings therefore in the cylinder heads by the employment of the method embodying my invention and which I have hereinbefore described in detail.

Having thus described my invention, what I claim and desire to secure by Letters Patent is:

1. The method of uniting two metal bodies one of which is provided with an opening for the reception of the other of said bodies or a portion thereof of a diameter slightly greater than the diameter of said opening, which consists in causing the said metal body or the portion thereof which is to be inserted into the said opening to contract to a diameter slightly less than that of the said opening, inserting the same into said opening, and thereafter permitting expansion thereof.

2. The method of uniting two metal bodies one of which is provided with an opening for the reception of the other of said bodies or a portion thereof of a diameter slightly greater than the diameter of said opening when the two bodies are at normal room temperature, which comprises the cooling from normal room temperature of the said second named body or the portion thereof which is to be inserted into said opening to a temperature sufficient to effect contraction thereof to a diameter slightly less than that of said opening, inserting the said body or the said portion thereof into said opening, and thereafter permitting the temperature of the said body or portion to increase.

3. The method of uniting two metal bodies one of which is provided with an opening and the other one of which or a portion thereof is of an area in transverse section slightly greater than that of the transverse area of said opening, which consists in cooling the second named body to a temperature sufficient to effect contraction thereof or the portion thereof which is to be inserted into said opening to an extent sufficient to render its transverse area slightly less than that of the corresponding area of the said opening, inserting the said body or the said portion thereof into said opening, and thereafter permitting the temperature of the inserted body or portion to increase to effect expansion thereof.

4. The method of uniting two metal bodies one of which is provided with an opening and the other one of which or a portion thereof is of an area in transverse section slightly greater than that of the transverse area of said opening, which consists in subjecting the second named body to the action of a refrigerant to cool the same to an extent sufficient to cause contraction thereof sufficiently to permit the insertion thereof or a portion thereof into the said opening, inserting the said body or the said portion thereof into the said opening, and permitting it to expand therein.

5. The method of uniting two metal bodies one of which is provided with an opening and the other one of which or a portion thereof is of an area in transverse section slightly greater than that of the transverse area of said opening, which consists in placing the second named body in a refrigerant to cool the same sufficiently to effect contraction thereof to an extent to permit its insertion or the insertion of a portion thereof into the said opening, inserting the same or the said portion thereof in said opening, and thereafter permitting expansion thereof.

6. The method of uniting two metal bodies one of which is provided with an opening and the other one of which or a portion thereof is of an area in transverse section slightly greater than that of the transverse area of said opening, which consists in placing the second named body in a bath of liquefied gas to effect cooling thereof and cause contraction thereof to an extent sufficient to permit its insertion or of a portion thereof into said opening, inserting the said body or the said portion thereof into said opening, and thereafter permitting expansion thereof within said opening.

7. The method of uniting two metal bodies one of which is provided with an opening and the other one of which or a portion thereof is of area in transverse section slightly greater than that of the transverse area of said opening, which consists in placing the second named body in a bath of liquefied air to effect contraction thereof, inserting the same or the said portion thereof into said opening, and thereafter permitting expansion within said opening.

In testimony that I claim the foregoing as my invention, I have hereunto signed my name this 31st day of August, 1927.

OTIS D. TREIBER.